3,090,992
APPARATUS FOR THE MANUFACTURE OF FILAMENTS OR OTHER SHAPED STRUCTURES FROM THERMOPLASTS
Hans Schlachter and Oskar Kunze, Frankfurt am Main, Germany, assignors to Farbwerke Hoechst Aktiengesellschaft vormals Meister Lucius & Brüning, Frankfurt am Main, Germany, a corporation of Germany
Filed May 16, 1960, Ser. No. 29,510
Claims priority, application Germany May 21, 1959
2 Claims. (Cl. 18—12)

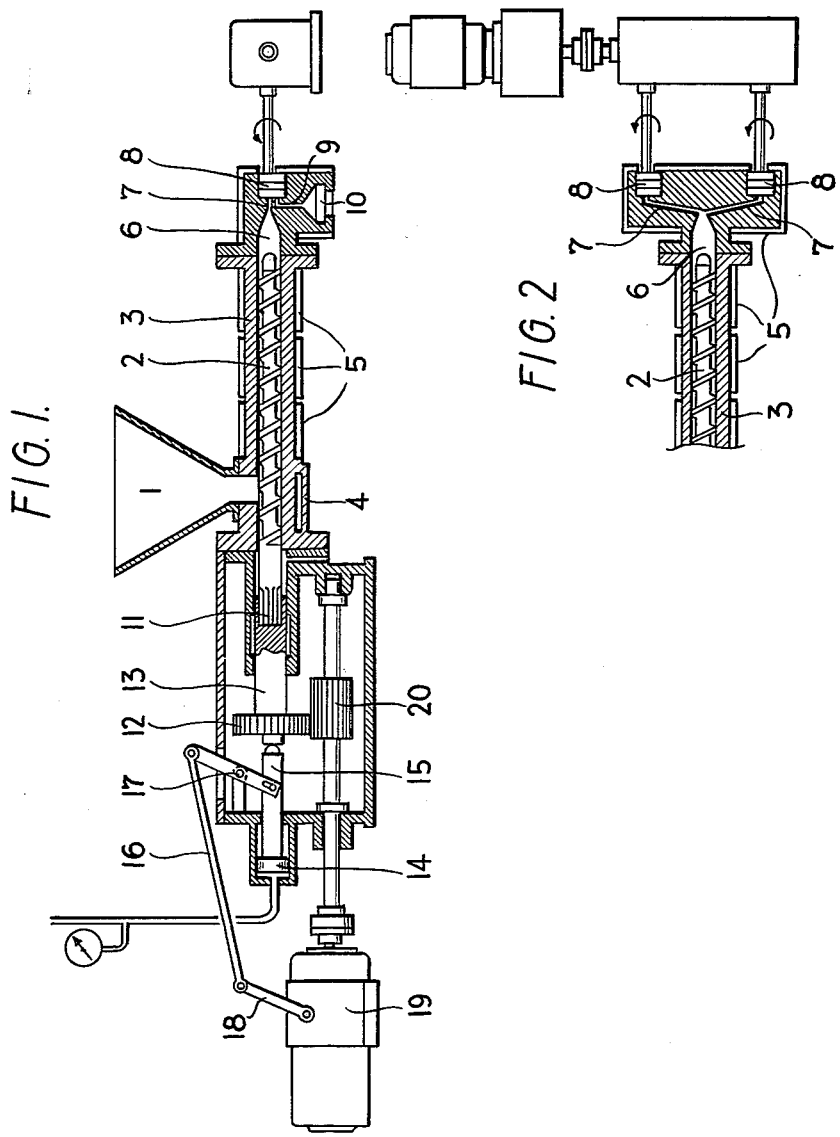

The present invention relates to an apparatus for the manufacture of shaped structures such as filaments or foils from thermoplasts.

It is known to make profile rods, tubes, threads, bristles, filaments and foils from thermoplasts on a heatable extruder. The material to be shaped is fed to the extruder in a pulverulent or granular form, melted on its passage to the nozzle, degassed, homogenized and compressed. If the melt has to be extruded against a very large resistance of the extruder nozzle or orifice or if an exactly regulated conveying performance is desired, for example in the manufacture of fibers and filaments, a pump having a constant volume output is provided, hereinafter referred to as a metering pump, which is independently driven and connected in series with the extruder to deliver the molten polymer towards the nozzle. If several extrusion or spinning units are fed by one extruder, a corresponding number of pumps may be connected in series with the extruder, the pumps being connected in parallel with one another.

When such combinations of extruders with metering pumps connected in series are used, care has to be taken that the conveying capacity of the extruder is exactly adjusted to the delivery of the metering pumps which run at a constant speed. If such exact adjustment is not achieved and the screw supplies an excess amount of melt, the pressure in the melt between the screw and the metering pumps is too high and may cause mechanical damage to the apparatus or lead to an excessively strong pressure flow of the molten material in the extruder. In the latter instance, agglomeration occurs in the feed zone of the extruder and conveying may be stopped. The pressure in the melt in front of the metering pumps should not be too small, however, or drop to 0 since this would reduce the rate of admission to the pumps and cause variations in the delivery of the pumps.

With such apparatus, a feed screw is provided for delivering the material to be extruded to the pump. Safe operation can only be achieved when the pressure in the melt is measured after leaving the screw and the screw speed is adjusted by hand or automatically to a given pump speed in a manner such that the pressure in the melt remains nearly constant. Measuring the pressure of hot melts of plastics is, however, complicated and involves considerable difficulties when readily decomposable plastics are concerned. Moreover, a readjustment by hand of the screw speed for a prolonged time is not practicable in industry. The installation of an automatic regulating device, however, involves considerable expenditures.

The present invention provides an apparatus for the melt spinning of filaments or the manufacture of other shaped structures from thermoplasts which enables a constant pressure to be maintained in a simple manner in the melt between the screw and the pumps and dispenses with a direct control of the pressure in the melt.

The apparatus of the invention to be used for the manufacture of shaped structures from thermoplasts consists of a single screw extruder and at least one metering pump which conveys the molten plastic from the extruder to one or more nozzles. The apparatus of the invention comprises a screw which is displaceable in an axial direction and on which an adjustable constant force acts in the direction of transport and an infinitely variable drive for the rotation of the screw and is further characterized in that the axial motion of the screw is coupled with the adjusting lever of the infinitely variable drive. The axial force acting on the screw may be produced, for example, by a piston operated hydraulically or by compressed air or it may be produced by pre-tensioned springs. Since the screw is displaceable in an axial direction and can be loaded with a constant force which is to a large extent independent of the position of the screw, the screw serves as a member for sensing the pressure. When the pressure of the melt produced by the screw has a tendency to exceed a predetermined value which depends on the adjustment of the hydraulic pressure or the pre-tension of the springs, the screw can yield backward in a direction opposite to the direction of transport. By coupling said shifting with the adjusting lever of the infinitely variable drive, the screw speed is reduced. Conversely, when the pressure in the melt has a tendency to decrease, i.e. when the conveying capacity of the screw is too small, the screw is shifted in the direction of transport whereby the pressure in the melt is maintained, while the screw speed is simultaneously increased automatically by the aforesaid coupling, and the conveying capacity is thus increased.

An apparatus suitable for use in carrying out the process of the invention is illustrated diagrammatically by way of example in the accompanying drawings.

FIG. 1 of the drawings is a side elevation of the apparatus of the invention with a metering pump connected in series. FIG. 2 is a sectional plan view longitudinally of the end portion of the extruder with two metering pumps connected in series.

The thermoplast to be made into shaped structures, for example filaments, is fed in the form of powder or granules to the feed hopper 1 and falls on its own accord or with the help of a known feeding means into the feed zone of the screw 2. By the rotation of the screw the material is conveyed towards the pump 8, melted on its passage, degassed, kneaded and homogenized. The bushing 3 of the extruder is provided with a cooling jacket 4 and heating collars 5 to maintain the necessary working temperature. The molten material which has been thus pretreated proceeds under the pressure produced by the screw to a buffer space 6 which is connected by channels 7 with the suction side of one or more metering pumps 8 which convey the melt at a constant rate through the pressure channels 9 to the nozzles or orifices 10. The screw 2 is connected with the drive shaft 13 by a keyway coupling 11. A gear wheel 12 is mounted on the drive shaft 13 in coaxial alignment with the screw 2 and is axially movable with the drive shaft 13 and screw 2 as a unit. The driving gear wheel 20 has teeth of a length to mesh with the teeth of the gear wheel 12 throughout the entire range of movement of the screw 2 as it is shifted axially so that the gears are always in meshing engagement.

The piston 14 is loaded with oil or compressed air which acts on the end portion of the drive shaft 13. The pressure producing system (not shown) which is connected to piston 14 operates in such a manner that the pressure applied remains constant even when the piston is shifted. The load is transmitted from the piston 14 to the rotating drive shaft 13 via a cylindrical extension piece 15 of piston 14. To the extension piece 15 there is secured a pivoted rod 16 which is connected via a fixed point 17 with the adjusting lever 18 of an infinitely variable speed drive 19 for the rotation of the screw.

The apparatus in the invention has the great advantage that the pressure in the melt between the screw 2 and the pumps 8 is automatically kept at an adjustable constant value which depends on the selected pressure of the constant pressure source of oil acting on the piston 14. For this purpose, the coupling of the screw 2 with the adjusting lever 18 of the infinitely variable drive 19 is effected in a manner such that the drive 19 runs at a maximum speed when the screw projects farthest into the buffer space 6. When the screw moves backward the speed of the drive is reduced and reaches a minimum value, and advantageously stops, when the piston 14 reaches the backward stop. When the apparatus is in operation, the screw is in a position of equilibrium which is produced, on the one hand, by the pressure in the melt acting on the screw and, on the other hand, by the pressure acting on piston 14. The screw acts like a piston of a cross-sectional area corresponding to the major diameter of the screw. In addition to the force produced by the pressure in the melt, another force appears which is produced by the frictional resistance produced in the forward movement of the plastic mass on its passage through the extruder. The latter force has to be taken into consideration when the oil pressure is adjusted at the piston 14; in general, the said force is, however, small as compared with the force produced by the pressure in the melt.

When, for example, the delivery of the pumps 8 is varied while the apparatus is in operation or when a pump breaks down, the screw is shifted in a longitudinal direction, without the pressure in the melt being changed, which in turn leads to a corresponding change of the screw speed and therefore an adjustment of the conveying capacity of the screw to the changed total delivery of the pumps. Variations in pressure due to irregularities in the feed zone of the screw are also automatically compensated to a considerable extent by the apparatus of the invention.

The apparatus of the invention can be used with particular advantage for the melt spinning of synthetic filaments and fibers when it is desired to feed a relatively great number of spinning units by one extruder. If, in that instance, one or more spinning units break down owing to failure of the nozzles or pumps the conveying capacity of the screw adjusts itself immediately to the changed working conditions, without the working of the screw or the spinning units still in operation being disturbed. Also, when such a plant is started or stopped, the individual pumps may be switched on or off in succession, without an adjustment by hand of the screw speed being necessary.

The apparatus of the invention may also be used with advantage when only one spinning unit is connected with the extruder or when foils or similar objects are extruded in the case of which it is desired to dispose a metering pump after the screw. If the metering pump breaks down and fails to deliver, the screw moves back to the backward stop and thus adjusts the screw speed to 0. If, for some reason or other, it is desired to use a variable speed gear which cannot be adjusted to a screw speed equal to 0, a switch may be disposed at the backward dead point of the piston or the screw by means of which the drive of the screw is switched off so that an unpermissible pressure increase is avoided.

The apparatus of the invention has the further advantage that a pressure which may vary within wide limits can be adjusted in the melt after the screw by means of hydraulic pressure. The degree to which the melt is homogenized and kneaded depends to a great extent on the pressure in the melt. The apparatus of the invention therefore has a wide range of application since it permits operating under a pressure which is appropriate for a given material, without exchanging the screw. The apparatus of the invention therefore also permits the use of relatively short screws of simple design.

We claim:
1. In an extruding apparatus for simultaneously producing a plurality of shaped structures from thermoplasts, a constant speed metering pump for each of the plurality of shaped structures which delivers liquid thermoplast to its particular outlet orifice, a rotary feed screw for delivering liquid thermoplast to the plurality of pumps at a constant pressure to maintain a substantially constant rate of flow from each outlet orifice, means to mount the feed screw for movement axially, variable speed driving means to rotate said screw from zero to a maximum speed corresponding to the rate of flow required for all of the pumps, said screw having a piston, a cylinder enclosing the piston, means for maintaining a fluid at a constant pressure in the cylinder which acts on the piston and tends to move the screw in one direction, the thermoplast acting on the screw tending to move it in the opposite direction against the fluid in the cylinder, and a mechanical linkage connected to the screw and variable speed driving means and actuated by the axial movement of the screw to adjust the variable speed driving means in a range from zero to maximum speed whereby to adapt one or more of the constant speed metering pumps to be stopped without changing the constant pressure of the liquid thermoplast supplied to each metering pump by the screw.

2. In an extruding apparatus for producing a shaped structure from thermoplasts, a constant speed metering pump which delivers liquid thermoplast to an outlet orifice, a rotary feed screw for delivering liquid thermoplast to the pump at a constant pressure to maintain a substantially constant rate of flow from the outlet orifice, means to mount the feed screw for movement axially, variable speed driving means to rotate said screw from zero to a maximum speed corresponding to the maximum rate of flow required, said screw having a piston associated with the rearward end thereof, a cylinder enclosing the piston, means for maintaining a fluid in the cylinder at a constant pressure which acts on the piston and tends to move the screw forwardly, the thermoplast acting on the screw tending to move it rearwardly against the fluid in the cylinder, and a mechanical linkage connected to the screw and variable speed driving means and actuated by the axial movement of the screw to adjust the variable speed driving means in a range from zero to maximum speed whereby to adapt the constant speed metering pump to be stopped without changing the constant pressure of the liquid thermoplast supplied to the pump by the screw.

References Cited in the file of this patent
UNITED STATES PATENTS

| | | |
|---|---|---|
| 1,516,968 | Johnson | Nov. 25, 1924 |
| 2,411,971 | MacMillin et al. | Dec. 3, 1946 |
| 2,540,146 | Stober | Feb. 6, 1951 |
| 2,541,201 | Buecken et al. | Feb. 13, 1951 |
| 2,680,880 | Corbett | June 15, 1954 |
| 2,767,437 | Marshall | Oct. 23, 1956 |
| 2,903,747 | Wucher | Sept. 15, 1959 |

FOREIGN PATENTS

| | | |
|---|---|---|
| 523,210 | Canada | Mar. 27, 1956 |
| 1,150,253 | France | Jan. 9, 1958 |
| 1,190,301 | France | Mar. 31, 1959 |